May 24, 1960  R. V. VANA  2,937,655
PNEUMATIC CONTROL DEVICE

Filed Oct. 17, 1957  2 Sheets-Sheet 1

INVENTOR.
RICHARD V. VANA
BY Joseph E Ryan
ATTORNEY

May 24, 1960 R. V. VANA 2,937,655
PNEUMATIC CONTROL DEVICE
Filed Oct. 17, 1957 2 Sheets-Sheet 2

INVENTOR.
RICHARD V. VANA
BY Joseph E Ryan
ATTORNEY

United States Patent Office 2,937,655
Patented May 24, 1960

2,937,655

PNEUMATIC CONTROL DEVICE

Richard V. Vana, Medinah, Ill., assignor to Minneapolis-Honeywell Regulator Company, Minneapolis, Minn., a corporation of Delaware Filed Oct. 17, 1957, Ser. No. 690,717

7 Claims. (Cl. 137—85)

This invention relates to pneumatic control devices and particularly to an improved pneumatic relay.

Figure 1:
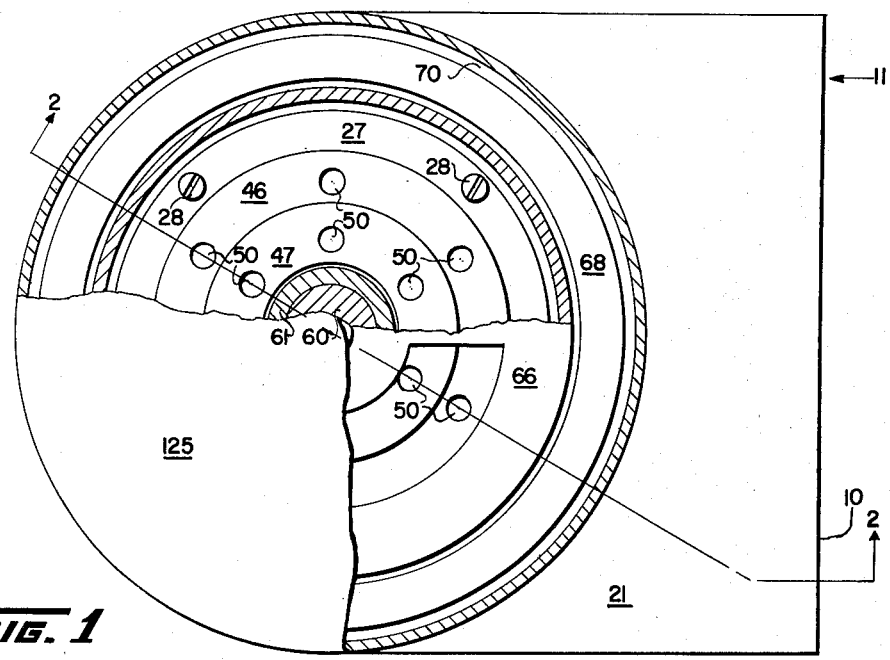
Figure 2:
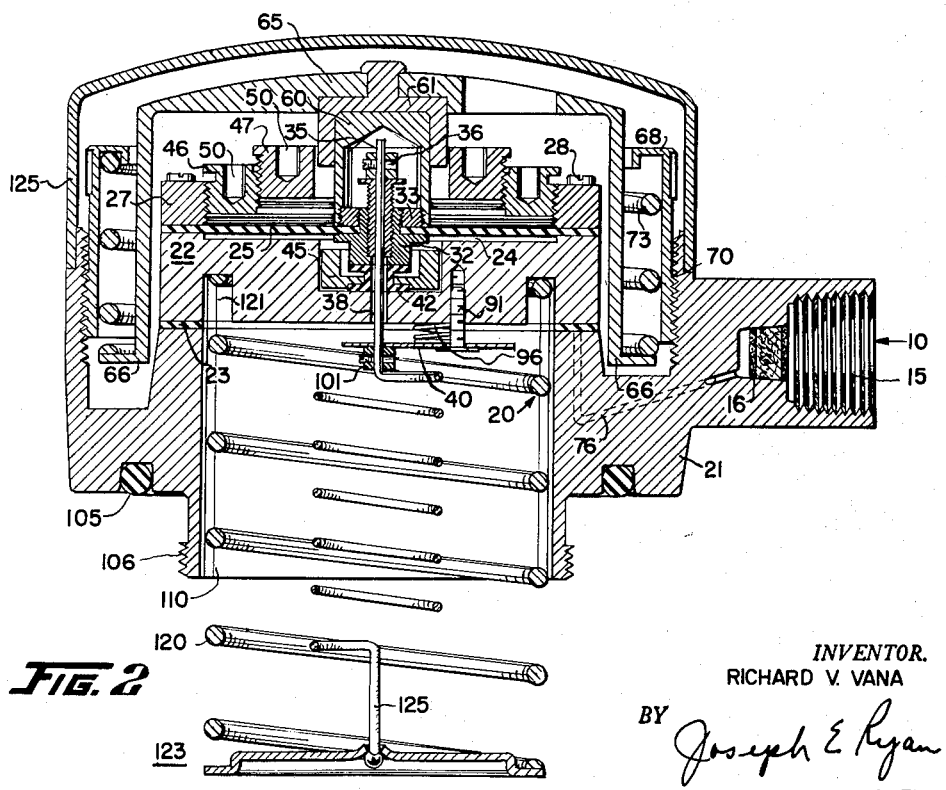
Figure 3:
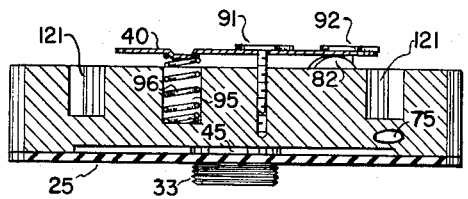
Figure 4:
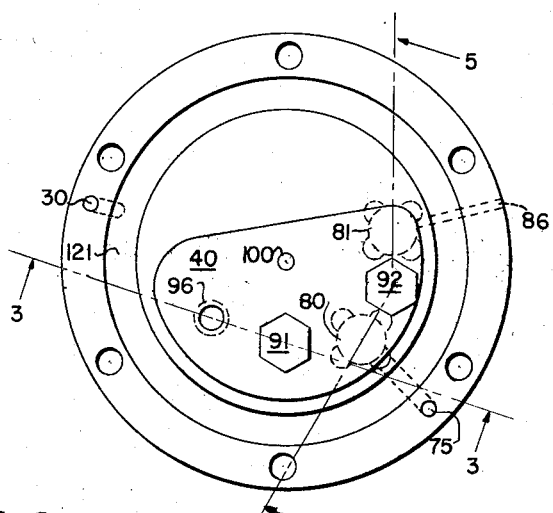
Figure 5:
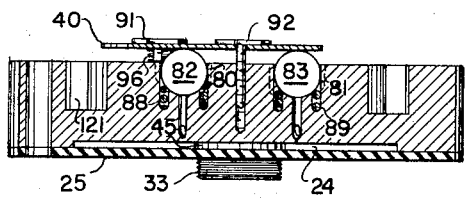

Devices of this type are generally old and the present invention is directed to an improved relay design including a simplified arrangement for adjusting the range of operation of the device for the effective pressure range over which the device will be operative. Generally such adjustment is obtained by effecting varying spring pressure on the operating element for the relay and in the present invention the effective range control is obtained by varying the effective area of the pilot diaphragm through a simplified adjustment mechanism. It is therefore an object of this invention to provide an improved pneumatic relay having a simplified adjustment mechanism which will vary the effective operating pressure range of the relay. A further object of this invention is to provide in an improved pneumatic relay a simplified arrangement for varying the effective area of the pilot diaphragm to control the effective range of operation of the relay. These and other objects of this invention will become apparent from the attached description together with the drawings wherein:

Figure 1 is a top view of the improved control device;

Figure 2 is an enlarged sectional view of the device of Figure 1 showing the relationship of parts; and Figures 3, 4 and 5 are views of a portion of the device, Figure 3 being a sectional view of the device of Figure 4 taken along the line 3—3, Figure 5 being a sectional view of the device of Figure 4 taken along the line 5—5 and Figure 4 is a bottom view of the base structure of the improved control apparatus.

Figure 1, the top view of the device, shows basically a generally cylindrical configuration for the control apparatus together with the flange structure which houses conduits for the main line pressure indicated at 10 and the pilot line pressure indicated at 11 for operating the improved pneumatic relay. In the sectional view in Figure 2, it will be seen that each of these conduits have threaded inner peripheries 15 to adapt the connection of an external conduit thereto. Also included in the inlet portion or conduit is a filter 16 for each of the inlets which lead respectively to pilot line and main line passages in the base structure of the device indicated generally at 20. This base structure is comprised of a lower portion 21 which includes the inlet conduits 10 and 11 and an upper section indicated at 22 mounted on and sealed to the section 21 through a gasket means indicated at 23. In the upper surface of the base portion 22 is a recessed area indicated generally at 24 which provides the pilot chamber for the control device over which is positioned a diaphragm indicated at 25. The diaphragm is secured to the section 22 through a support means indicated at 27 which in turn is secured by means of screws 28 to the portions 21, 22 and 23 to hold the base portions and the support in assembled relationship. The chamber positioned between the base portion 22 and the diaphragm, as previously indicated, is the pilot chamber previously referred to. A conduit, which is shown in part in Figure 4 at 30, is connected through a similar tapped conduit (not shown) in the base 21 and in the lead conduit 10 to provide pilot pressure to this chamber. As shown in Figure 2, the diaphragm is centrally secured by means of a two part attachment means indicated at 32 and 33, the part 32 being located in the pilot chamber 24, and is secured to the diaphragm, and clamped thereon, by means of the part 33 positioned on the upper surface of the diaphragm, and threaded over the tapped projection of the part 32. Extending through the parts 32, 33, is a wire-like connector member indicated at 35 having a locking mechanism 36 attached at the extremity thereof. The connector member extends through an aperture 38 in the base portion 22 to a lever member 40 of a valving or relay structure which will be later described in detail. Also positioned in the chamber 24 and associated with the diaphragm connection member 32 is a sealing member 42 which effectively seals the high pressure in passage 38 from the pilot chamber 24 but still permits vertical movement of the diaphragm through stretching or compressing of the member 42. A supporting structure 45 is also positioned in the chamber 24 and maintains the annular channel-like sealing member 42 in position to effect a positive closure of the pilot chamber 24 to prevent air pressure from the relay structure to enter the pilot chamber.

Mounted on the connecting member 33 through a threaded connection is a two-part spring connecting section, including a member 60, and a second member 61, loosely fitted over the member 60. Member 60 provides an air seal between chamber 110 and atmosphere by sealing against diaphragm 25. The member 61 mounts a spring retaining structure 65 which is generally cup-shaped in form and has a flanged lower lip 66 against which the extremity of a coil start spring 73 is positioned. The opposite extremity of the coil is mounted in a spring adjusting member or cup 68 which is threaded into a recessed surface 70 of the base portion 21 for spring adjustment purposes. By adjusting the member 68 relative to the base portion 21, the extremity of the spring 73 may be changed to vary the force applied through the flange 66 of the spring support structure 65 applying the bias force through the members 60 and 61 and the diaphragm 25. The spring 73 is effectively positioned between the base structure and the diaphragm and operates to exert a biasing force on the diaphragm acting against the force of the pilot pressure on the undersurface of the diaphragm to control the movement of the diaphragm and the wire-like connecting member 35 connected thereto to operate the plate or lever 40 of the relay which is shown in detail in the Figures 3–5. By adjusting the cup-shaped member 68 relative to the base portion, the bias on the diaphragm may be adjusted to determine the starting point or the pressure effective to move the diaphragm. The effective range of operation or the pressure range over which the diaphragm will be movable is determined by the effective area of the diaphragm, this adjustment being accomplished as previously noted by moving one or the other of the rings 46, 47 adjacent to or away from the diaphragm.

Mounted on the supporting structure 27 are a plurality of annular ring-like members 46 and 47, which are threaded at their inner and outer peripheries and in turn are threaded into the threaded periphery of the support 27. These ring-like members are adjustment mechanisms for the range adjustment of the relay, and are adjustable through tool receiving recesses indicated at 50 in the upper surfaces thereof to be moved or threaded relative to the support structure 27 to a position adjacent the diaphragm such that they effectively cover the diaphragm and decrease the effective area thereof. It will be seen from Figure 2 that the effective range of the relay may be controlled by positioning the rings 46, 47 relative to the diaphragm such that they may or may not impede diaphragm movement. Thus a first operating range is obtained when both rings are moved away from the diaphragm. A second operating range for the relay is obtained by moving the ring 46 adjacent the diaphragm or threading the same into the support structure 27 until it is disposed adjacent the diaphragm to prevent movement of the portion of the diaphragm underlying the ring. A still further or third range of adjustment may be obtained by moving the ring 47 down into the ring 46 and adjacent the diaphragm to further decrease the effective area of the diaphragm.

Figures 3, 4, and 5 show basically the details of the base portion 22 together with the diaphragm mounted thereon and the relay plate 40 positioned on the undersurface thereof. Referring specifically to Figure 4, it will be seen that main line pressure is directed to the base through an aperture indicated at 75 which connects through an aperture shown in phantom at 76 in the base portion 21 leading to the main line conduit 10. Positioned on the undersurface of the base portion 22 are a plurality of recesses indicated generally at 80 and 81 having positioned therein ball-like sealing members 82, 83 which sealing members close the conduits connected thereto. As will be indicated in Figure 4, the conduit 75 leads from the recess 80 to the conduit 76 and the inlet conduit 10, and a conduit shown in phantom at 86 extends from recess 81 to atmosphere. This three-way valve arrangement is generally old and is shown more in detail in the Patent No. 2,310,293 to F. D. Joesting, dated February 9, 1943. The ball members 82, 83 are urged away from their seats through the operation of spring means indicated at 88, 89, respectively, and the ball members are held in position in the recesses by operation of the plate which is secured to the base portion 22 by means of two retaining screw means indicated at 91, 92, respectively, which operate to limit outward movement of the plate and retain the same in position over the balls. A bias spring 96 positioned in a recess 95 in the base portion which will be seen in Figure 3 urges the plate 40 against the surface of the balls 82, 83 to close these passages in the normal operating position of the valve. The linkage or wire-like connecting member 35 from the diaphragm is connected to the plate through an aperture indicated at 100 and and is secured to the plate through a locking means indicated at 101. It will be noted that by movement of the plate through the wire-like member, the plate will rock on one or the other of the balls to open or close the respective passages 86 and 75 to either exhaust air from the surface below the base portion 22 or will allow main line air to be vented through the passages 75, 76 to the portion below the base 22. In Figure 2, it will be seen that the relay structure is not mounted on any associated device but that it is provided with a suitable sealing means such as an O-ring 105 positioned in the base portion 21 and a threaded flange extension 106 by means of which this device may be mounted on and sealed to an associated actuator. Although not shown, it will be understood that the chamber formed by the undersurfaces of the base portions 20 and 21 or that indicated generally at 110 will fit into the variable chamber of an actuator. Branch line pressure or control pressure from the relay or valving structure which will be bled from the ball-type valve 82 will enter the chamber 110 and operate the actuator. A follower mechanism in the form of a spring 120 positioned at one extremity in a recess 121 in the base portion 22 and having a plate 123 at the opposite extremity thereof is designed to fit against the movable portion of the device to be operated such as a diaphragm or piston. This spring permits the plate 123 to follow the actuator movement. Also connected to this plate is the follower spring 125 which at its other extremity is connected through the locking means 101 to the plate 40 of the relay to provide a follow-up action on the relay. The wire-like member 35 and spring 125 may be integral if desired.

In operation, this improved pneumatic relay is for the most part conventional with the exception of the adjustment structure which provides a simplified adjusting arrangement. Main line pressure is fed through the conduit 76 and the passage 75 to the valving structure formed by the ball 82 and the recessed seat 80. Pilot pressure introduced through the conduit 11 is fed through the conduit 30 to the undersurface of the diaphragm 25 or the operating chamber 24. This pilot pressure will act against the bias force of the start spring 73 and when the pilot pressure is of sufficient magnitude it will tend to move the associated structure, including the connecting portion 33, 32, and the wire-like member 35 to impart a movement to the plate 40 tending to open and close, respectively, one or the other of the valve members 82, 83. With an increase in branch line pressure, the plate 40 will be so positioned that the plate will rock on the ball 83 closing the exhaust passage 86 and opening the inlet passage 75 to allow main line pressure to fill the chamber 110 applying an operating pressure to the device to be operated. Movement of the movable element of the actuator or the device to be operated will cause movement of the follower plate 123 and spring 125 to reposition the plate 40 closing the valve structure. A decrease in pilot pressure will effect an opposite direction of movement of the plate 40 causing the plate to pivot on the ball 82 and open the exhaust passage 86 to relieve the pressure in the chamber 110 causing the device to be operated or the actuator to move in the opposite direction. The adjustment means in the form of the rings 46, 47 may be adjustably positioned adjacent the diaphragm to vary the effective area thereof and hence vary the range of pressure required to move the diaphragm and hence operate the relay. While we have shown a cylindrical or helical start spring 73, it will be understood that other biasing arrangements may be utilized to effect a bias force on the diaphragm 25. It will also be noted that the cup structure 65 has apertures therein such that the adjustable rings may be displaced to vary the effective operating range of the relay without disassembly of the parts. The cover indicated at 125 is fitted over the upper portion of the base portion 20 to enclose the structure. This element may be simply removed for adjusting the device when so desired.

In considering this invention, it should be noted that the present description is intended to be illustrative only and that we wish to be limited in our invention only by the scope of the appended claims.

I claim:
1. A pneumatic control device comprising, a base structure including a recess therein, a diaphragm positioned over said recess to provide therebetween a pilot chamber variable in volume with movement of the diaphragm, support means connected to said base structure and securing said diaphragm in position over said recess having a threaded flange positioned above the upper surface of said diaphragm remote from said recess, means including a lever means connected to said diaphragm, valve means positioned on said base structure and operated through movement of said lever means, a plurality of annular members positioned on said support and adapted to be adjustably positioned relative to the upper surface of said diaphragm to decrease the effective area of said diaphragm, bias means positioned between said base and said diaphragm to urge said diaphragm into said recess or pilot chamber, adjustment means for varying said bias means to vary the bias on said diaphragm, and follower means connected to said lever and operative to position said lever in proportion to operation of said valve means.

2. A pneumatic control device comprising, a base structure including a recess therein, a diaphragm positioned over said recess to provide therebetween a pilot chamber variable in volume with movement of the diaphragm, support means connected to said base structure and securing said diaphragm in position over said recess having a threaded flange positioned above the upper surface of said diaphragm remote from said recess, means including a lever means connected to said diaphragm, valve means positioned in part on said base structure and operated through movement of said lever means, a plurality of annular rings having threaded inner and outer peripheries and varying radial dimensions adapted to be threaded respectively into said support and one another and be positioned over the upper surface of said diaphragm opposite said pilot chamber, said rings being adapted to be threaded into engagement with said diaphragms to decrease or vary the effective areas of the diaphragm exposed to the pilot chamber, bias means positioned between said base and said diaphragm to urge said diaphragm into said recess or pilot chamber, adjustment means for varying said bias means to vary the bias on said diaphragm, and follower means connected to said lever and operative to position said lever in proportion to valve operation.

3. A pneumatic control device comprising, a base structure including a recess therein, a diaphragm positioned over said recess to provide therebetween a pilot chamber variable in volume with movement of the diaphragm, support means connected to said base structure and securing said diaphragm in position over said recess having a flange portion positioned adjacent said diaphragm and remote from said recess, means including a lever means connected to said diaphragm, valve means positioned in part on said base structure and operated through movement of said lever means, adjustable means connected in part to said flange portion and effective to engage portions of the upper surface of said diaphragm remote from said pilot chamber to vary the movable portion of said diaphragm, bias means positioned between said base and said diaphragm to urge said diaphragm into said recess or pilot chamber, adjustment means for varying said bias means to vary the bias on said diaphragm, and follower means connected to said lever and operative to position said lever in proportion to valve operation.

4. A pneumatic control device comprising, a base structure having a recess therein, diaphragm means positioned over said recess to provide with said base structure a variable pilot chamber, support means secured to said base and securing said diaphragm in position thereon, three-way valve means including inlet, outlet and exhaust passages included in said base structure and a pivoted plate member for operating said valve means positioned on the under surface of said base structure, an aperture extending from said recess to said plate, connection means connecting said diaphragm with said plate for displacing the plate upon movement of said diaphragm, means sealing said aperture and allowing movement of said connection means, a plurality of adjustable means mounted in part on said support and selectively contacting said diaphragm to prevent movement of said diaphragm away from said recess, bias means positioned between said base and said diaphragm to urge the diaphragm into said recess, adjustment means for varying the effect of said bias means, and means connected to said plate of said valve means and adapted to be moved in proportion to the output pressure thereof.

5. A pneumatic control device comprising, a base structure having a recess therein, diaphragm means positioned over said recess to provide with said base structure a variable pilot chamber, support means secured to said base and securing said diaphragm in position thereon, three-way valve means including inlet, outlet and exhaust passages included in said base structure and a pivoted plate member for operating said valve means positioned on the under surface of said base structure, an aperture extending from said recess to said plate, connection means connecting said diaphragm with said plate for displacing the plate upon movement of said diaphragm, means sealing said aperture and allowing movement of said connection means, a plurality of adjustable means mounted on said support and selectively contacting said diaphragm to prevent movement of said diaphragm away from said recess, bias means positioned between said base and said diaphragm to urge the diaphragm into said recess, adjustment means for varying the effect of said bias means, and follower means including a first spring and plate adapted to be positioned between the device to be operated and said base of said device with the plate to be moved with the device to be operated, and follower spring means connected to said plate and the plate of said valve means and operative to reposition said plate in accordance with the output thereof.

6. A pneumatic control device comprising, a base structure having a recess therein, diaphragm means positioned over said recess to provide with said base structure a variable pilot chamber, support means secured to said base and securing said diaphragm in position thereon, three-way valve means including inlet, outlet and exhaust passages included in said base structure and a pivoted plate member for operating said valve means positioned on the under surface of said base structure, an aperture extending from said recess to said plate, connection means connecting said diaphragm with said plate for displacing the plate upon movement of said diaphragm, means sealing said aperture and allowing movement of said connection means, a plurality of annular rings threaded into said support and into one another and adapted to be adjustably positioned to contact selectively the upper surface of said diaphragm and prevent movement of the portion of the diaphragm in contact with said adjustable rings from the neutral position of said diaphragm, bias means positioned between said base and said diaphragm to urge the diaphragm into said recess, adjustment means for varying the effect of said bias means, and means connected to said plate of said valve means and adapted to be moved in proportion to the output pressure thereof.

7. A pneumatic control device comprising, a base structure including a recess therein, a diaphragm positioned over said recess to provide therebetween a pilot chamber variable in volume with movement of the diaphragm, means connected to said base structure and securing said diaphragm in position over said recess, valve means positioned on said base structure and operated through movement of said diaphragm, adjustable means positioned in part on said base structure to vary the effective area of said diaphragm, bias means positioned between said base and said diaphragm to urge said diaphragm into said recess, and adjustment means for varying said bias means to vary the bias on said diaphragm.

References Cited in the file of this patent

UNITED STATES PATENTS

| | | |
|---|---|---|
| 2,286,282 | Joesting | June 16, 1942 |
| 2,326,226 | Joesting | Aug. 10, 1943 |
| 2,401,144 | Dube | May 28, 1946 |
| 2,451,451 | Tate | Oct. 12, 1948 |
| 2,612,870 | Roetter | Oct. 7, 1952 |
| 2,811,138 | Clements | Oct. 29, 1957 |
| 2,811,165 | McLuen | Oct. 29, 1957 |
| 2,834,208 | Westman | May 13, 1958 |